(No Model.)

T. M. BIDDLE.
PREPARED SURFACE OF ARTICLES FOR SEALING.

No. 462,855. Patented Nov. 10, 1891.

WITNESSES:
H. C. Hartman
Albert Baker

INVENTOR
Thos. M. Biddle
BY
D. D. Weisell
ATTORNEY

UNITED STATES PATENT OFFICE.

THOMAS M. BIDDLE, OF FORT WAYNE, INDIANA, ASSIGNOR OF ONE-HALF TO DAVID D. WEISELL, OF SAME PLACE.

PREPARED SURFACE OF ARTICLES FOR SEALING.

SPECIFICATION forming part of Letters Patent No. 462,855, dated November 10, 1891.

Application filed January 28, 1891. Serial No. 379,478. (No specimens.)

*To all whom it may concern:*

Be it known that I, THOMAS M. BIDDLE, a citizen of the United States, residing at Fort Wayne, in the county of Allen and State of Indiana, have invented new and useful Improvements in Prepared Surfaces of Articles for Sealing, of which the following is a specification.

The object of this invention is to so prepare the sealing portion of stamps, envelopes, and other articles to be sealed in such manner that the surfaces which have been sealed together cannot be separated by either heating or moistening the sealing substances employed.

To such end my improvement consists in respectively preparing different portions of one or both of the surfaces to be united with a soluble and an insoluble cement or sealing substance, one of which requires heat to develop its adhesive properties and the other moisture for a like purpose.

Figure 2:
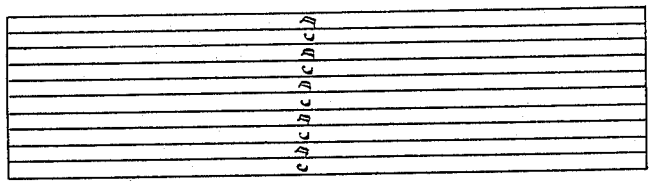
Figure 1:
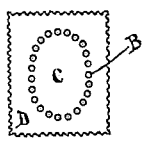
Figure 3:
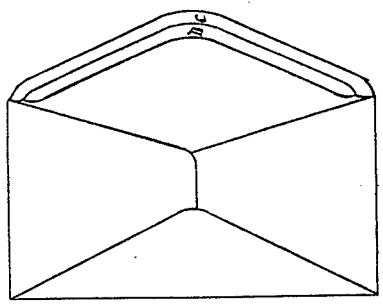
Figure 5:
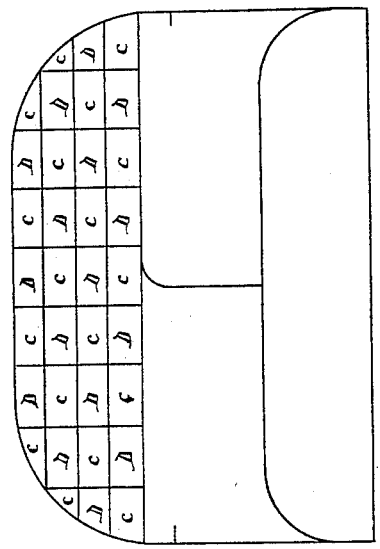
Figure 4:
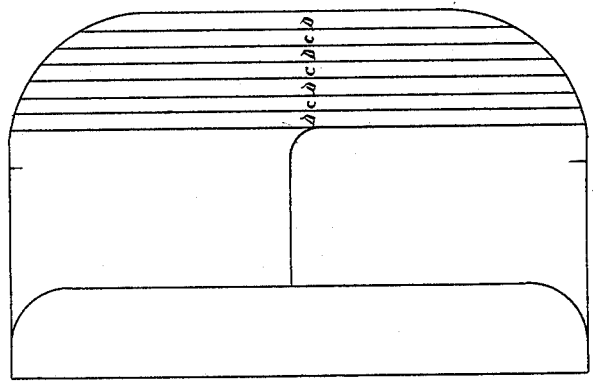
Figure 6:
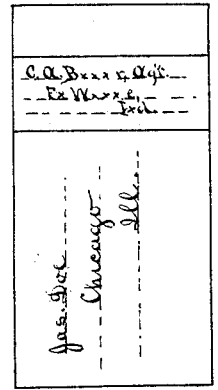

In the drawings, Figure 1 indicates the back of a postage-stamp provided with two kinds of sealing substances. Fig. 2 illustrates a strip of paper or other fabric provided with said two sealing substances. Figs. 3, 4, and 5 illustrate envelopes having their flaps prepared in a similar way, and Fig. 6 one mode of applying the strip.

In carrying out my invention one of the adhesive substances or cements used can be any ordinary mucilage, consisting of a gum or gummy substance which is soluble in water and which, as in the case of envelopes, postage-stamps, and the like, is spread upon the articles to be sealed in the form of a paste or solution and then dried thereon, whereby the cohesive or sticky properties of the cement can be developed and brought into use by a slight application of moisture, and the part thus prepared united to another surface either upon the same or another article. The other cement, employed in conjunction with the one already described, will consist of an insoluble cement which is impervious to moisture—such, for example, as marine glue—and can be made of pitch, resins, gums, wax, or other analogous substances, either alone or in combination, which require heat to develop their cohesive or sticky properties, so that after this insoluble cement has been applied to the article to be sealed and allowed to harden the portion covered by such cement can be united to another surface of the same or another article by heating the insoluble cement; or the insoluble cement or substance used may be of such nature that the applied heat may not only develop the sticky qualities, but also vulcanize, harden, or change it so that a reapplication of heat will not soften it sufficiently to allow the surfaces so united to again be separated.

By applying the soluble and insoluble cement to different portions of the surface of the article to be sealed and then sealing the same to an opposing surface the union between the surfaces thus united will not be entirely destroyed by exposure of the same to such conditions as will soften either one of the cements, and since, while the cohesive properties of one cement may be impaired, the remaining cement will still serve to hold the opposing surfaces of the article or articles together.

The two sealing substances can be applied to either one or both of the surfaces to be sealed in a variety of ways—as, for example, in small stripes or patches alternately of the soluble and the insoluble sealing substance or cement—or the insoluble substance may be made in separate sheets, strips, or ribbons and inserted between the surfaces to be sealed. To unite such surfaces, the soluble or mucilaginous stripes or patches can be properly moistened and the surfaces pressed together in the usual way. Sufficient heat can then be applied to render the insoluble or waterproof cement soft and adhesive, so that on cooling it will harden and also serve to unite the two surfaces, or, if a vulcanizable substance be employed with sufficient heat, it will be found hardened and the two surfaces inseparably united.

Any suitable fiber may be incorporated in one or both of the cements or sealing substances to render the surfaces united still more difficult of separation.

In preparing postage-stamps according to my invention the stamp can be provided with a circular, angular, or irregular line of perforations around the central portion of the stamp, the space within this ring or line of perforations being coated with the insoluble cement and the space between the ring or line and the margin of the stamp coated with the mucilage or soluble cement. By such means the stamp can be applied by moistening one and heating the other sealing substance, and by reason of its line of perforations its detachment without mutilation will be practically impossible. The user of the stamp can moisten and attach it in the usual way and the post-office officials can apply heat sufficient to soften and develop the adhesiveness of the resinous or insoluble cement. Hence the removal and re-use of the stamp will be impossible without defacing its face.

Strips of paper or other suitable material can be coated with the herein-described two sealing substances and can be attached to letters, packages, or analogous bundles as a safeguard against their being unlawfully opened or tampered with, the said prepared strips being attached in any suitable way—as, for example, by crossing the meeting edges or flaps or by being wrapped around the article. For registered letters and express-packages strips or bands thus prepared could be suitably engraved and numbered for each office from which or through which such letters or packages are transmitted. The official receiving the same can put on the usual envelope or wrapper and with the address across one end thereof and then attach the prepared strip which designates his office below the address and around the envelope or wrapper, and can then write his signature across the band. In like manner the next official receiving the same can put on a prepared band and indorse it with his signature. These, however, are but a few of the many ways in which my invention can be employed, and are merely cited as illustrations of its extreme usefulness in the wide field of its employment.

Having thus described my invention, what I claim is—

An article having a sealing-surface prepared with a soluble and an insoluble cement, one of which is rendered adhesive by moisture and the other by heat, substantially as described.

In testimony whereof I have hereunto set my hand in the presence of two subscribing witnesses.

THOMAS M. BIDDLE.

Witnesses:
H. C. HARTMAN,
ALBERT BAKER.